United States Patent
Song et al.

(10) Patent No.: US 9,570,091 B2
(45) Date of Patent: *Feb. 14, 2017

(54) MUSIC PLAYING SYSTEM AND MUSIC PLAYING METHOD BASED ON SPEECH EMOTION RECOGNITION

(71) Applicant: National Chiao Tung University, Hsinchu (TW)

(72) Inventors: Kai-Tai Song, Hsinchu (TW); Carlos Cervantes, Hsinchu (TW)

(73) Assignee: National Chiao Tung University, Hsingchu (TW)

( * ) Notice: Subject to any disclaimer, the term of this patent is extended or adjusted under 35 U.S.C. 154(b) by 542 days.

This patent is subject to a terminal disclaimer.

(21) Appl. No.: 13/859,760

(22) Filed: Apr. 10, 2013

(65) Prior Publication Data

US 2014/0172431 A1   Jun. 19, 2014

(30) Foreign Application Priority Data

Dec. 13, 2012   (TW) .............................. 101147277 A

(51) Int. Cl.
*G10L 25/00*   (2013.01)
*G06F 17/00*   (2006.01)
(Continued)

(52) U.S. Cl.
CPC ......... *G10L 25/63* (2013.01); *G06F 17/30017* (2013.01); *G06F 17/30026* (2013.01)

(58) Field of Classification Search
CPC .......... G10L 25/63; G10L 25/48; G10L 25/54; G10L 15/265; G06F 17/30; G06F 17/30023; G06F 17/30026; G06F 17/3074; G06F 17/30743; G06F 17/30746;G06F 17/30749; G06F 17/30755; G06F 17/30758; G06F 17/30764; G06F 17/30772
(Continued)

(56) References Cited

U.S. PATENT DOCUMENTS 7,576,278 B2   8/2009   Urata
7,764,311 B2   7/2010   Bill
(Continued)

FOREIGN PATENT DOCUMENTS

WO   2012019827   2/2012

OTHER PUBLICATIONS

"Office Action of Taiwan Counterpart Application", issued on Sep. 1, 2014, p. 1-p. 5.
(Continued)

*Primary Examiner* — Paras D Shah
(74) *Attorney, Agent, or Firm* — Jianq Chyun IP Office

(57) ABSTRACT

A music playing system and a music playing method suitable for playing music based on speech emotion recognition are provided. The music playing method includes following steps. A plurality of songs and song emotion coordinates of the songs mapping on an emotion coordinate graph are stored in a first database. Emotion recognition parameters are stored in a second database. A voice data is received and analyzed, and a current emotion coordinate of the voice data mapping on the emotion coordinate graph is obtained according to the second database. The setting of a target emotion coordinate is received. At least one specific song emotion coordinate closest to a cheer-up line connecting the current emotion coordinate and the target emotion coordinate is found. Songs corresponding to aforementioned emotion coordinates are sequentially played.

4 Claims, 5 Drawing Sheets

(51) Int. Cl.
*G10L 25/63* (2013.01)
*G06F 17/30* (2006.01)

(58) Field of Classification Search
USPC ..... 704/270, 270.1, 275; 707/916, 705, 706, 707/736, 770, 769, 772, 776; 84/600, 601, 84/615
See application file for complete search history.

(56) References Cited

U.S. PATENT DOCUMENTS

| | | | | |
|---|---|---|---|---|
| 8,407,055 | B2* | 3/2013 | Asano et al. | 704/270 |
| 8,489,606 | B2* | 7/2013 | Lee et al. | 707/738 |
| 8,583,615 | B2* | 11/2013 | White et al. | 707/705 |
| 2004/0237759 | A1* | 12/2004 | Bill | 84/668 |
| 2006/0054007 | A1* | 3/2006 | Lu et al. | 84/611 |
| 2006/0143647 | A1* | 6/2006 | Bill | 725/10 |
| 2007/0131095 | A1* | 6/2007 | Park et al. | 84/609 |
| 2007/0150281 | A1* | 6/2007 | Hoff | 704/270 |
| 2007/0157795 | A1* | 7/2007 | Hung | 84/600 |
| 2007/0174274 | A1* | 7/2007 | Kim | G06F 17/30743 |
| 2008/0189331 | A1* | 8/2008 | Lee et al. | 707/104.1 |
| 2009/0164131 | A1 | 6/2009 | Jung et al. | |
| 2009/0182736 | A1 | 7/2009 | Ghatak | |
| 2011/0289075 | A1* | 11/2011 | Nelson | 707/723 |
| 2012/0089396 | A1* | 4/2012 | Patel et al. | 704/249 |
| 2013/0138684 | A1* | 5/2013 | Kim et al. | 707/769 |
| 2013/0268273 | A1* | 10/2013 | Chen et al. | 704/249 |
| 2014/0052731 | A1* | 2/2014 | Dahule et al. | 707/740 |

OTHER PUBLICATIONS

Hsu et al., "LyQ—An Emotion-aware Music Player," Proc. of AAAI Workshop on Computational Aesthetics: Artificial Intelligence Approaches to Beauty and Happiness, May 18, 2006, pp. 1-4.

Yang et al., "Mr. Emo: Music Retrieval in the Emotion Plane," Proc. of the ACM International Conference on Multimedia (demostration), Oct. 23-27, 2008, pp. 1003-1004.

Dornbush et al., "XPOD—A Human Activity and Emotion Aware Mobile Music Player," Proc. of International Conference on Mobile Technology, Applications and Systems, Nov. 17, 2005, pp. 1-6.

* cited by examiner

MUSIC PLAYING SYSTEM AND MUSIC PLAYING METHOD BASED ON SPEECH EMOTION RECOGNITION

CROSS-REFERENCE TO RELATED APPLICATION

This application claims the priority benefit of Taiwan application serial no. 101147277, filed on Dec. 13, 2012. The entirety of the above-mentioned patent application is hereby incorporated by reference herein and made a part of this specification.

BACKGROUND OF THE INVENTION

1. Field of the Invention

The invention generally relates to a music playing system and a music playing method, and more particularly, to a music playing system and a music playing method based on speech emotion recognition.

2. Description of Related Art

Presently, not many smart and interactive music playing systems are available, and most existing ones require the users to manually input selection data. In U.S. Pat. No. 7,764,311, human facial expressions are recognized based on features of human face images captured by a video camera, and after that, multimedia contents (for example, videos and music) are played according to the detected human emotions. This technique requires a camera of high-resolution and optimal processing capability therefore is quite costly.

Additionally, a song searching method is disclosed in U.S. Application No. 20090182736, in which appropriate music is selected and played according to a pre-established song-emotion mapping database and current emotion data manually input by a user. However, because the current emotion data of the user needs to be manually input, the song that is selected and played is determined by the user subjectively instead of through an objective mechanism.

SUMMARY OF THE INVENTION

The invention provides a music playing system suitable for playing music based on speech emotion recognition. The music playing system includes a first database, a second database, a voice receiving device, and a control device. The first database stores a plurality of songs and song emotion coordinates of the songs mapping on an emotion coordinate graph. The second database stores emotion recognition parameters. The voice receiving device receives a voice data. The control device is connected to the first database, the second database, and the voice receiving device. The control device analyzes the voice data and obtains a current emotion coordinate of the voice data mapping on the emotion coordinate graph according to the second database. After that, the control device receives the setting of a target emotion coordinate, searches for at least one specific song emotion coordinate closest to a cheer-up line connecting the current emotion coordinate and the target emotion coordinate in the first database, and plays selected songs sequentially.

According to an embodiment of the invention, the control device divides the voice data into a plurality of sub voice data, analyzes frequencies of the sub voice data, and obtains the current emotion coordinate corresponding to a frequency combination of the sub voice data in the voice data according to the second database.

According to an embodiment of the invention, the control device further receives the information of the number of songs to be played in a session. When the song number information is N (where N is a positive integer), the control device determines N−2 intermediate nodes on the cheer-up line, where the N−2 intermediate nodes evenly divide the cheer-up line into N−1 parts. The control device determines N−2 specific song emotion coordinates respectively closest to the N−2 intermediate nodes and searches for a first song emotion coordinate closest to the current emotion coordinate, N−2 specific songs corresponding to the N−2 specific song emotion coordinates, and a destination song emotion coordinate closest to the target emotion coordinate in the first database.

According to an embodiment of the invention, the music playing system further includes a playing device connected to the control device. The playing device sequentially plays a first song corresponding to the first song emotion coordinate, N−2 specific songs corresponding to the N−2 specific song emotion coordinates, and a destination song corresponding to the destination song emotion coordinate according to a tendency of the cheer-up line.

According to an embodiment of the invention, the emotion coordinate graph is a two-dimensional coordinate graph, the X-axis of the two-dimensional coordinate graph indicates an emotion valence parameter, and the Y-axis of the two-dimensional coordinate graph indicates an emotion arousal parameter.

The invention provides a music playing method suitable for playing music based on speech emotion recognition. The music playing method includes following steps. A plurality of songs and song emotion coordinates of the songs mapping on an emotion coordinate graph are stored in a first database. Emotion recognition parameters are stored in a second database. A voice data is received. The voice data is analyzed, and a current emotion coordinate of the voice data mapping on the emotion coordinate graph is obtained according to the second database. The setting of a target emotion coordinate is received. At least one specific song emotion coordinate closest to a cheer-up line connecting the current emotion coordinate and the target emotion coordinate is searched for in the first database.

As described above, the invention provides a music playing system and a method thereof. The method allows the music playing system to automatically select songs from a song database, wherein the selected songs are presented as two-dimensional valence-arousal values. In addition, the invention provides a cheer-up strategy. If the voice of a user is recognized as carrying a negative emotion, different types of music is automatically selected and played to boost the mood of the user and bring peacefulness and happiness to the user's mind.

In order to make the aforementioned features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
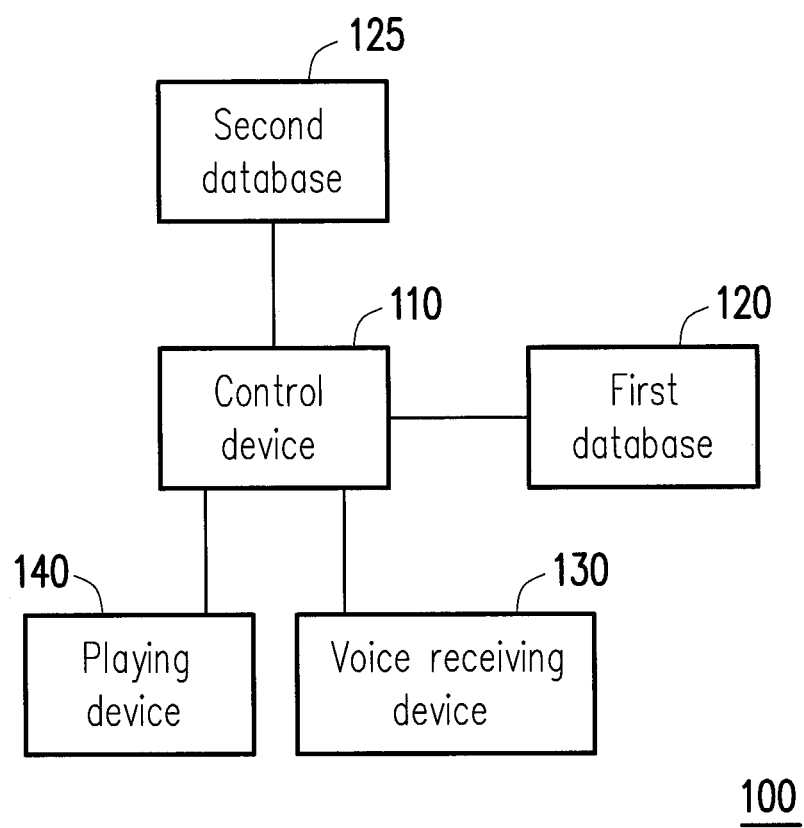
FIG. 1 is a function block diagram of a music playing system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a function block diagram of a music playing system according to an embodiment of the invention. The music playing system 100 is suitable for playing music based on speech emotion recognition. The music playing system 100 includes a control device 110, a first database 120, a second database 125, a voice receiving device 130, and a playing device 140. The first database 120, the voice receiving device 130, and the playing device 140 are all connected to the control device 110. The music playing system 100 in the invention can be deployed in a smart phone, a tablet PC, a desktop PC, or a notebook computer. The control device 110 may be a function module implemented in hardware and/or software form. Herein the hardware may be one or a combination of different hardware devices, such as a central processing unit (CPU), a chipset, or a microprocessor, and the software may be an operating system or a firmware program. The voice receiving device 130 may be a microphone. The playing device 140 may be a general music player. The first database 120 and the second database 125 may be stored in a memory of an electronic device or on a network cloud.

Referring to FIG. 1, first, the music playing system 100 uses the first database 120 to store a plurality of songs and song emotion coordinates of the songs mapping on an emotion coordinate graph and uses the second database 125 to store emotion recognition parameters. Aforementioned emotion coordinate graph is defined based on the two-dimension emotional plane brought up by the psychologist Thayer, and which can be referred to FIGS. 2A-2B.

Figure 2A:
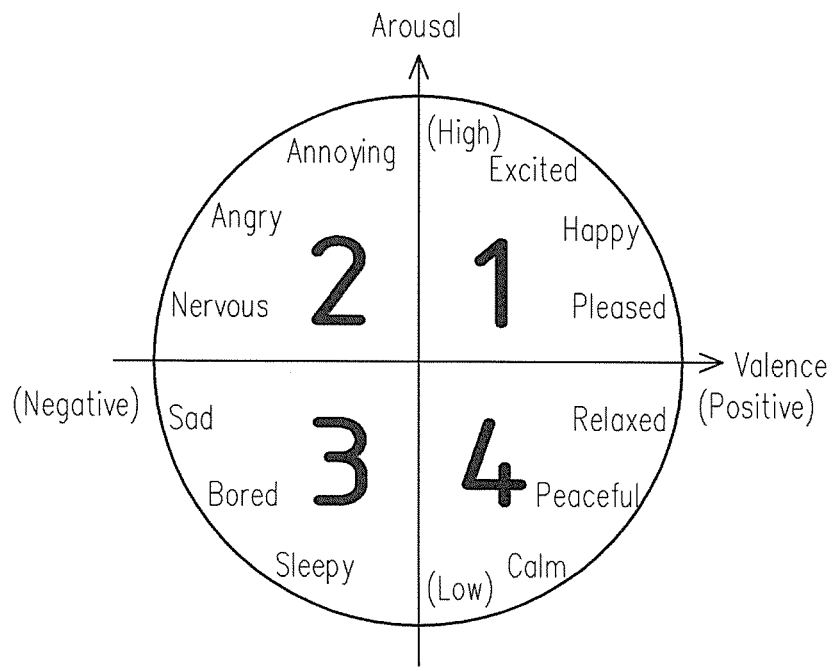
FIG. 2A is a diagram of a psychological two-dimension emotional plane.

FIG. 2A is a diagram of a psychological two-dimension emotional plane. The psychologist Thayer brought up the emotional plane illustrated in FIG. 2A. In FIG. 2A, the X-axis represents the emotional valence (positive to the right, and negative to the left), and the Y-axis represents the emotional arousal (which grows higher upwards and lower downwards). Different types of emotions, such as excited, happy, pleased, relaxed, peaceful, calm, sleepy, bored, sad, nervous, angry, and annoying, are defined in FIG. 2A.

Figure 2B:
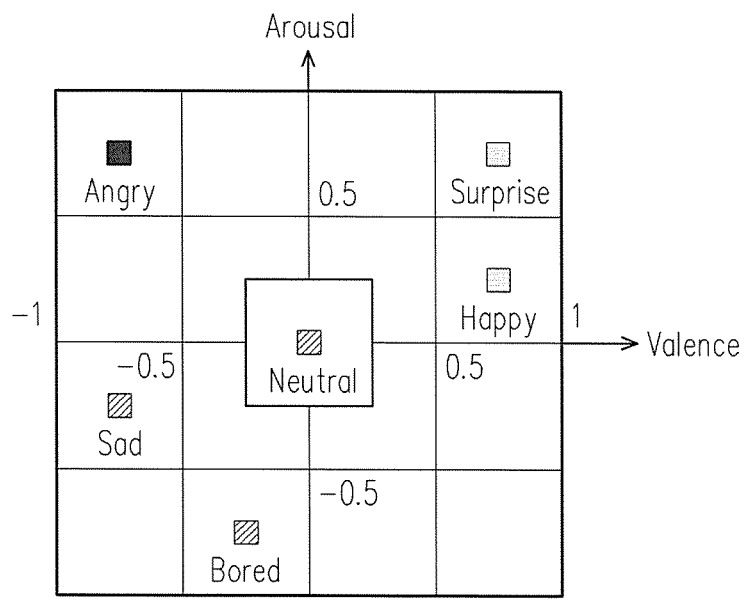
FIG. 2B illustrates an emotion coordinate graph according to an embodiment of the invention.

FIG. 2B illustrates an emotion coordinate graph according to an embodiment of the invention. Based on the definitions illustrated in FIG. 2A, the X-axis of the emotion coordinate graph indicates the emotional valence (the maximum value on the X-axis is +1, and the minimum value thereon is −1), and the Y-axis thereof indicates the emotional arousal (the maximum value n the Y-axis is +1, and the minimum value thereon is −1). In this emotion coordinate graph, a neutral emotion is defined in the central area, and emotions like surprise, happy, bored, sad, and angry are defined in other areas of the emotion coordinate graph.

Figure 3:
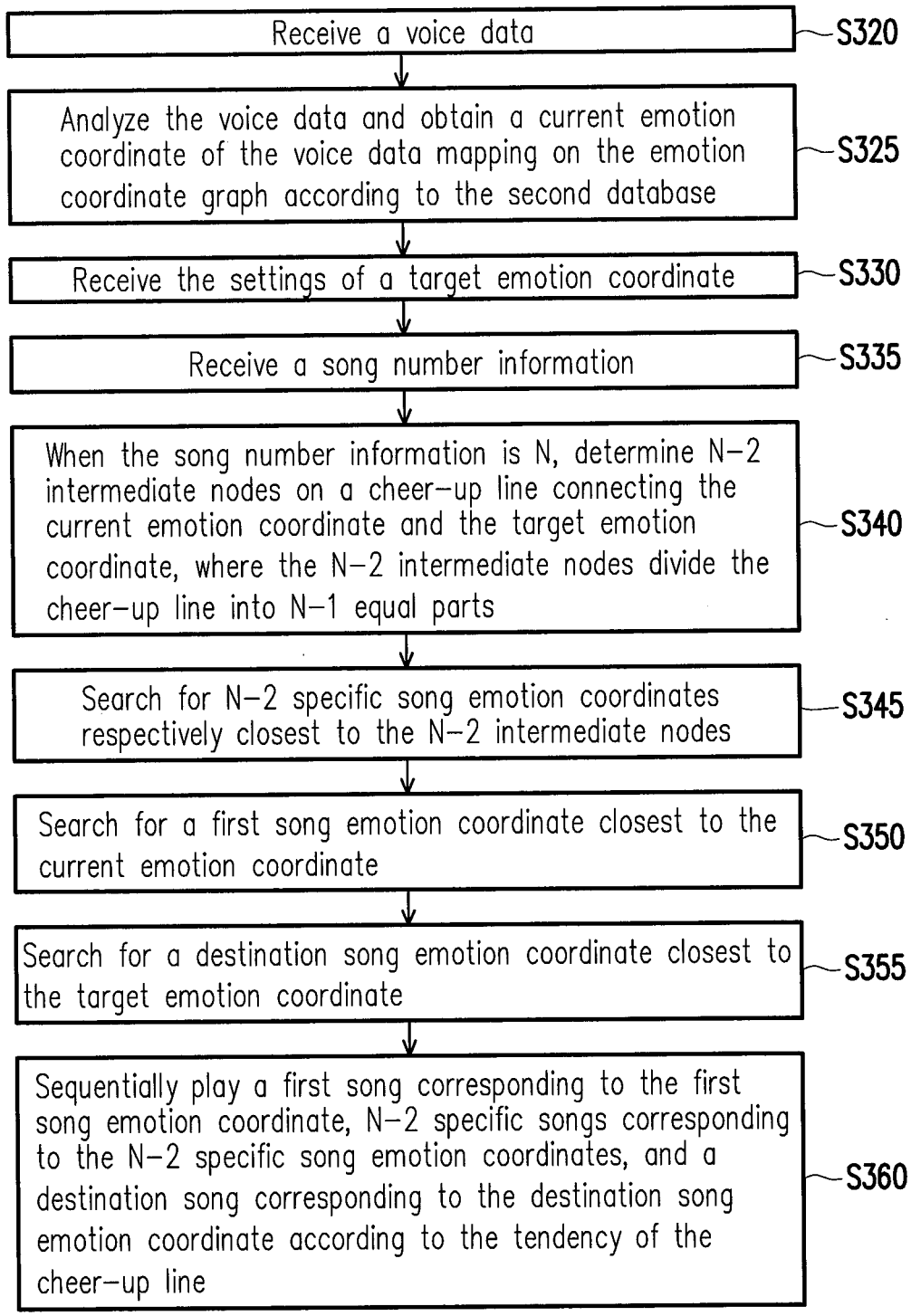
FIG. 3 is a flowchart of a music playing method according to an embodiment of the invention.

FIG. 3 is a flowchart of a music playing method according to an embodiment of the invention. Referring to both FIG. 1 and FIG. 3, after various information are established in the first database 120 and the second database 125, the voice receiving device 130 receives a voice data from a user (step S320). The control device 110 analyzes the voice data and obtains a current emotion coordinate of the voice data mapping on the emotion coordinate graph according to the second database 125 (step S325). To be specific, in step S325, the control device 110 divides the voice data into a plurality of sub voice data, then analyzes the frequencies of the sub voice data, and obtains the current emotion coordinate corresponding to a frequency combination of the sub voice data in the voice data according to information in the second database 125.

The user can determine the emotional state he or she wants to approach and input the target emotion coordinate correspondingly (step S330). The control device 110 receives the settings of the target emotion coordinate from the user. Next, the user inputs the number of songs he or she wants to listen into the music playing system 100, and the control device 110 receives this song number information (step S335).

Figure 4A:
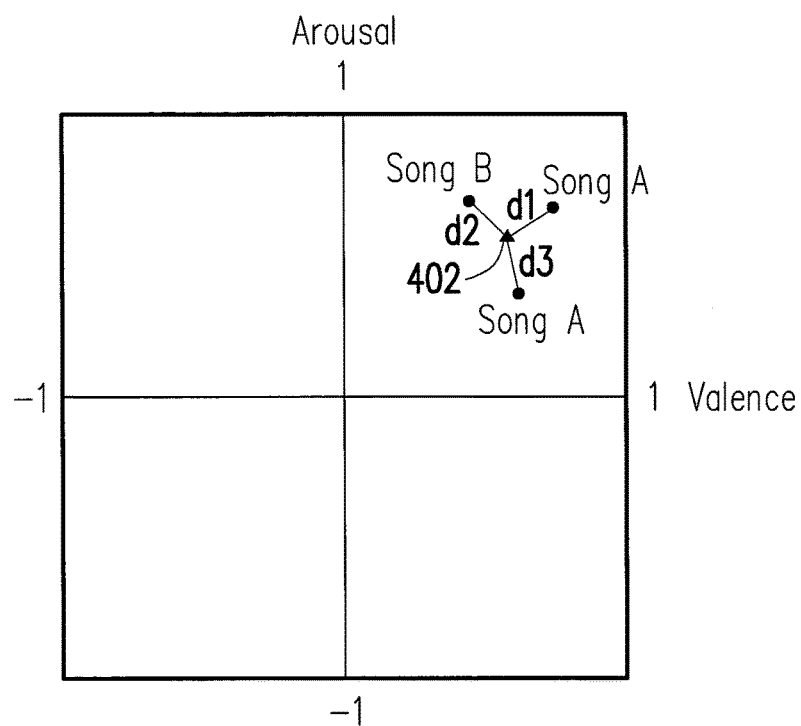
FIG. 4A is a diagram illustrating how the minimum distance between an emotion coordinate and a song emotion coordinate is calculated according to an embodiment of the invention.
Figure 4B:
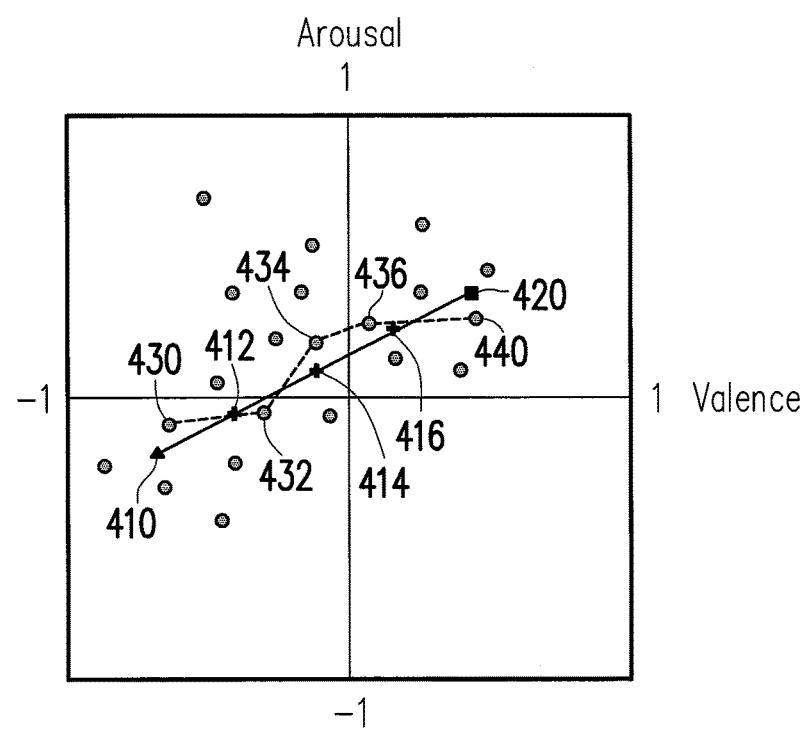
FIG. 4B is a diagram illustrating how songs are selected based on a cheer-up line according to an embodiment of the invention.

FIG. 4A is a diagram illustrating how the minimum distance between an emotion coordinate and a song emotion coordinate is calculated according to an embodiment of the invention. FIG. 4B is a diagram illustrating how songs are selected based on a cheer-up line according to an embodiment of the invention. Following steps will be explained with reference to both FIG. 4A and FIG. 4B. As mentioned in foregoing steps, in the first database 120, each song has a corresponding song emotion coordinate (for example, the songs A, B, and C in FIG. 4A). In the invention, the song emotion coordinate closest to a selected emotion coordinate (for example, the triangular mark 402 in FIG. 4A) is determined by calculating a Euclidean distance. Namely, the Euclidean distances d1, d2, and d3 are calculated to determine which one of the songs A, B, and C is closest to the selected emotion coordinate 402 in FIG. 4A, and the song has the shortest distance is the song closest to the selected emotion coordinate.

In step S335, the control device 110 receives the song number information. When the song number information is N (where N is a positive integer), the control device 110 determines N−2 intermediate nodes on a cheer-up line connecting the current emotion coordinate and the target emotion coordinate. Herein the N−2 intermediate nodes divide the cheer-up line into N−1 equal parts (step S340). After that, the control device 110 searches for N−2 specific song emotion coordinates respectively closest to the N−2 intermediate nodes (step S345), a first song emotion coordinate closest to the current emotion coordinate (step S350), and a destination song emotion coordinate closest to the target emotion coordinate in the first database 120 (step S355). Finally, the control device 110 sequentially plays a first song corresponding to the first song emotion coordinate, N−2 specific songs corresponding to the N−2 specific song emotion coordinates, and a destination song corresponding to the destination song emotion coordinate according to the tendency of the cheer-up line (step S360).

Referring to FIG. 4B, assuming that the song number information is 5, three intermediate nodes (the cross marks 412, 414, and 416) are determined on the cheer-up line connecting the current emotion coordinate (the triangular mark 410) and the target emotion coordinate (the square mark 420). Herein the three intermediate nodes divide the cheer-up line into four equal parts. Then, three specific song emotion coordinates respectively closest to the three intermediate nodes (the marks 432, 434, and 436 in FIG. 4B), the first song emotion coordinate closest to the current emotion coordinate (the mark 430), and the destination song emotion coordinate closest to the target emotion coordinate (the mark 440) are searched. The first song corresponding to the first song emotion coordinate 430, three specific songs corresponding to the three specific song emotion coordinates 432, 434, and 436, and the destination song corresponding to the destination song emotion coordinate 440 are sequentially played according to the tendency of the cheer-up line. In other words, songs corresponding to the song emotion coordinates 430, 432, 434, 436, and 440 are sequentially played to bring the current emotion of the user to the target state (i.e., the emotional state closest to the target emotion coordinate 420).

Figure 5:
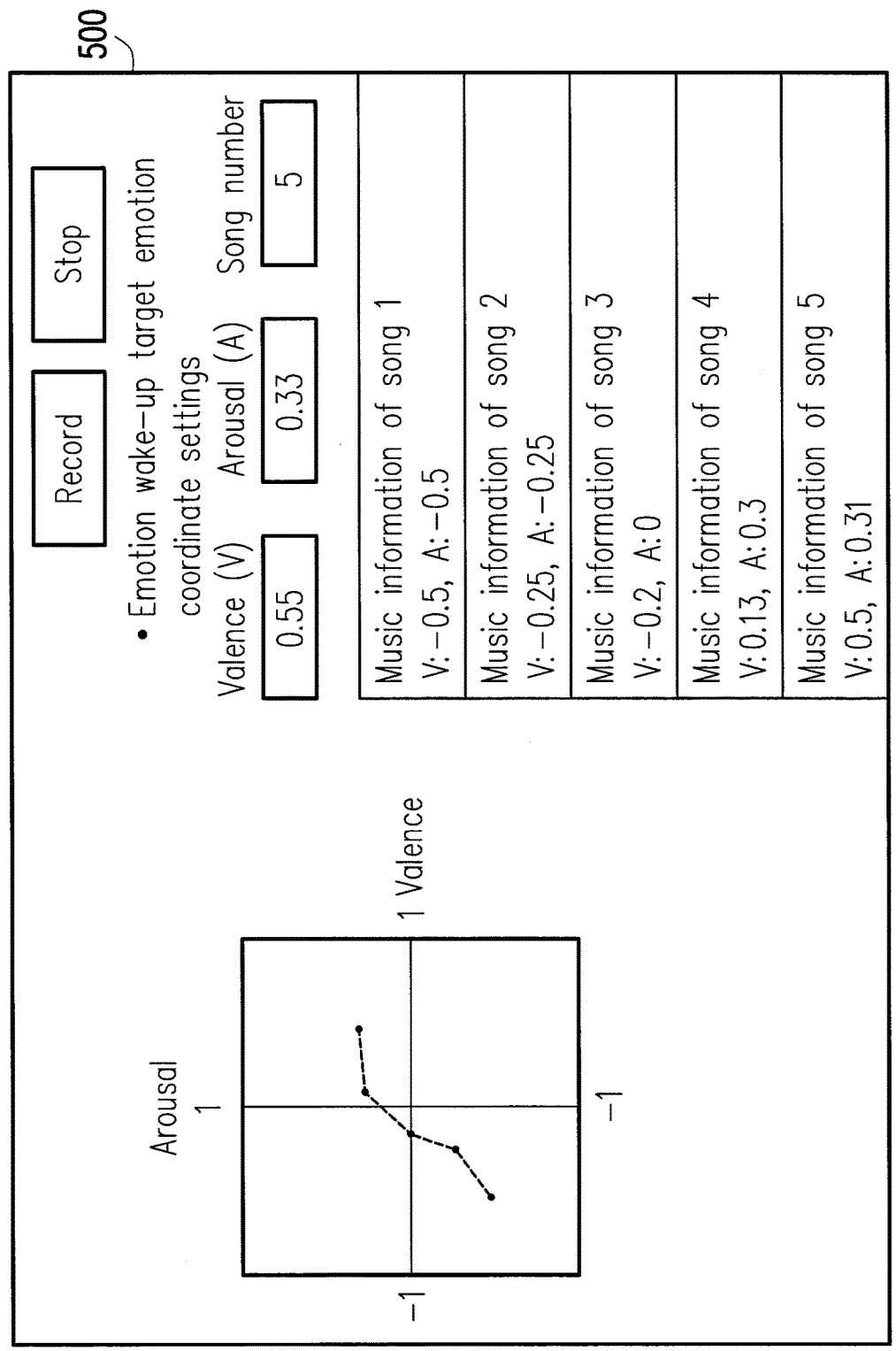
FIG. 5 is a diagram of a user interface of a music playing system according to an embodiment of the invention.

FIG. 5 is a diagram of a user interface of a music playing system according to an embodiment of the invention. In the user interface 500, a user inputs an emotional valence value 0.55, an emotional arousal value 0.33, and a song number 5 as the settings of a target emotion coordinate. Accordingly, the music playing system 100 provided by the invention selects five songs most suitable to the user and displays an emotion coordinate graph at the bottom left part of the user interface 500. These five songs are determined by the control device 110. Additionally, music information and valence and arousal coordinates of each song are displayed at the bottom right part of the user interface 500.

As described above, the invention provides a music playing system and a method thereof, in which an interactive human-machine interface is provided and voice signals are used for emotion recognition, so that a music player capable of emotion sensing is created and can be applied in smart phones and certain companion robots. Because human beings have complicated emotions (for example, happy or glad), these emotions cannot be distinguished according to some specific data types. Thereby, in the music playing system provided by the invention, a short utterance is projected to a two-dimensional valence-arousal coordinate, and any emotion of a user can be represented by a corresponding value. The method in the invention allows the system to automatically select songs from a song database, and the selected songs are also presented with two-dimensional valence-arousal values. In addition, a cheer-up strategy is provided. If a user's voice is determined to carry negative emotion, different types of music is automatically selected and played to boost the mood of the user and bring the user's mind to a peaceful and happy state. Through such emotion expression, the user can interact with the technical product more actively. The method provided by the invention can be applied to today most popular and inexpensive embedded platforms which provide electronic microphones and touch screens as the input devices. The music playing system in the invention may be integrated with various human-machine interface applications (for example, companion robot, car audio systems, and communication equipments), or the databases and recognition engines may be established through the cloud computing technology. Aforementioned communication device (for example, a cell phone) can play suitable music according to the emotional state of a user. Nowadays, embedded systems with low resource requirement and low price have been broadly applied to various products.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A music playing system, suitable for playing music based on speech emotion recognition, the music playing system comprising:
    a first database, storing a plurality of songs and song emotion coordinates of the songs mapping on an emotion coordinate graph;
    a second database, storing emotion recognition parameters;
    a voice receiving device, receiving a voice data;
    a control device, connected to the first database, the second database, and the voice receiving device, dividing the voice data into a plurality of sub voice data, analyzing frequency of the sub voice data, obtaining a current emotion coordinate of the voice data mapping on the emotion coordinate graph according to the second database, receiving settings of a target emotion coordinate, searching for at least one specific song emotion coordinate closest to a cheer-up line connecting the current emotion coordinate and the target emotion coordinate by calculating a Euclidean distance, receiving a song number information, when the song number information is N (wherein N is a positive integer), the control device determines N−2 intermediate nodes on the cheer-up line, the N−2 intermediate nodes divide the cheer-up line into N−1 equal parts, the control device determines N−2 specific song emotion coordinates respectively closest to the N−2 intermediate nodes and searches in the first database for a first song emotion coordinate closest to the current emotion coordinate and a destination song emotion coordinate closest to the target emotion coordinate by calculating the Euclidean distances between the plurality of song emotion coordinates of the songs and each of the N−2 intermediate nodes, the current emotion coordinate and the target emotion coordinate; and
    a playing device, connected to the control device, and sequentially playing a first song corresponding to the first song emotion coordinate, N−2 specific songs corresponding to the N−2 specific song emotion coordinates, and a destination song corresponding to the destination song emotion coordinate according to a tendency of the cheer-up line.

2. The music playing system according to claim 1, wherein the emotion coordinate graph is a two-dimensional coordinate graph, an X-axis of the two-dimensional coordinate graph indicates an emotion valence parameter, and a Y-axis of the two-dimensional coordinate graph indicates an emotion arousal parameter.

3. A music playing method, suitable for playing music based on speech emotion recognition, the music playing method comprising:
    storing a plurality of songs and song emotion coordinates of the songs mapping on an emotion coordinate graph by using a first database;
    storing emotion recognition parameters by using a second database;

receiving a voice data;
dividing the voice data into a plurality of sub voice data;
analyzing frequency of the sub voice data, and obtaining a current emotion coordinate of the voice data mapping on the emotion coordinate graph according to the second database;
receiving settings of a target emotion coordinate;
searching for at least one specific song emotion coordinate closest to a cheer-up line connecting the current emotion coordinate and the target emotion coordinate in the first database by calculating a Euclidean distance;
receiving a song number information by using a control device;
when the song number information is N (wherein N is a positive integer), determining N−2 intermediate nodes on the cheer-up line, wherein the N−2 intermediate nodes evenly divide the cheer-up line into N−1 parts;
determining N−2 specific song emotion coordinates respectively closest to the N−2 intermediate nodes by calculating the Euclidean distances between the plurality of song emotion coordinates of the songs and each of the N−2 intermediate nodes;
searching for a first song emotion coordinate closest to the current emotion coordinate in the first database by calculating the Euclidean distances between the plurality of song emotion coordinates of the songs and the current emotion coordinate;
searching for a destination song emotion coordinate closest to the target emotion coordinate in the first database by calculating the Euclidean distances between the plurality of song emotion coordinates of the songs and the target emotion coordinate; and
sequentially playing a first song corresponding to the first song emotion coordinate, N−2 specific songs corresponding to the N−2 specific song emotion coordinates, and a destination song corresponding to the destination song emotion coordinate according to a tendency of the cheer-up line.

4. The music playing method according to claim 3, wherein the emotion coordinate graph is a two-dimensional coordinate graph, an X-axis of the two-dimensional coordinate graph indicates an emotion valence parameter, and a Y-axis of the two-dimensional coordinate graph indicates an emotion arousal parameter.

\* \* \* \* \*